United States Patent
Segerdahl et al.

[15] 3,676,821
[45] July 11, 1972

[54] FLUID-PRESSURE TRANSDUCER

[72] Inventors: Roy R. Segerdahl, Belmore; Joseph L. Jonke, Bethpage, both of N.Y.

[73] Assignee: The Bunker-Ramo Corporation, Oak Brook, Ill.

[22] Filed: Dec. 5, 1968

[21] Appl. No.: 781,333

[52] U.S. Cl. ................................................338/41
[51] Int. Cl. ..............................................H01c 13/00
[58] Field of Search ................................338/41, 42

[56] References Cited

UNITED STATES PATENTS

| | | | |
|---|---|---|---|
| 3,056,934 | 10/1962 | Kyle et al. | 338/41 X |
| 3,136,968 | 6/1964 | Kramer | 338/41 |
| 3,136,969 | 6/1964 | Mollick | 338/41 |
| 3,173,120 | 3/1965 | Marks et al. | 338/41 X |

*Primary Examiner*—Rodney D. Bennett, Jr.
*Assistant Examiner*—Brian L. Ribando
*Attorney*—Frederick M. Arbuckle

[57] ABSTRACT

Apparatus for converting a change in fluid-pressure into mechanical motion of a part, which motion can be used to generate a suitable output signal. Two bands affixed to a sheave are wound thereon, side by side, in opposite directions. The free ends of the bands are connected to a pushrod which is in the same plane and at right angle to the axis of the sheave. The clockwise wound band is connected to the right of the axis of the sheave and other band is connected to the left thereof. The pushrod is connected at one of its ends to a pressure capsule which deflects when the fluid-pressure acting thereon is changed. This deflection causes the sheave to rotate and generate the desired output effect.

3 Claims, 2 Drawing Figures

Patented July 11, 1972 3,676,821

ROY R. SEGERDAHL
JOSEPH L. JONKE
INVENTORS 3,676,821

FLUID-PRESSURE TRANSDUCER

BACKGROUND OF THE INVENTION

This invention relates to fluid-pressure transducers and while it is of general application in accurately converting linear to rotary motion, it is particularly suitable for embodiment in such a transducer for adjusting the contact of an electrical potentiometer and will be described in such an embodiment.

Heretofore, there have been devised many fluid-pressure transducers for operating control devices such as potentiometers. However, these prior transducers have had several disadvantages when used to respond to relatively low pressures, especially when utilized in an application which subjects them to large acceleration and vibration forces, such as in missiles and aircraft for the measurement of barometric pressure. For example, they have customarily comprised a pressure capsule or diaphragm of fairly rugged construction to withstand acceleration forces and, when measuring the relatively low pressures, the amount of deflection has been necessarily limited requiring the addition of motion multiplying mechanisms which are relatively complex and costly. These mechanisms, by their very nature, introduce errors when they are subject to environmental accelerations and vibrations.

It is an object of this invention, therefore, to provide a new and improved fluid-pressure transducer which obviates one or more of the above mentioned disadvantages of the prior art devices.

It is another object of the invention to provide a new and improved fluid-pressure transducer capable of operating satisfactorily at relatively low pressures while substantially eliminating errors due to friction of the moving parts and to the effects of vibration and accelerating forces.

It is a further object of the invention to provide an inexpensive fluid-pressure transducer of the type described.

SUMMARY OF THE INVENTION

In accordance with the invention there is provided a fluid-pressure transducer comprising a support; a pressure deflectable element disposed to deflect in response to a change in fluid-pressure; a pushrod directly and positively secured to the deflectable element; a sheave located substantially in the same plane as the pushrod and rotatably mounted on the support having its axis of rotation substantially perpendicular to the pushrod; a pair of bands, each affixed to one end of the sheave and wound thereon, side by side, in opposite directions, the free end of the clockwise wound band being connected to the pushrod at a point to the right of the axis of the sheave, and the free end of the counterclockwise wound band being connected to the pushrod at a point to the left of the axis of the sheave; and means actuated by the pushrod for utilizing the displacement of the deflectable element to develop an output effect.

For a better understanding of the present invention together with further objects and features thereof, reference is had to the following description, to be read in conjunction with the accompanying drawings, wherein like components in the several views are identified by the same reference numeral, while its scope will be pointed out in the appended claims.

DESCRIPTION OF THE PREFERRED EMBODIMENTS

Figure 1:
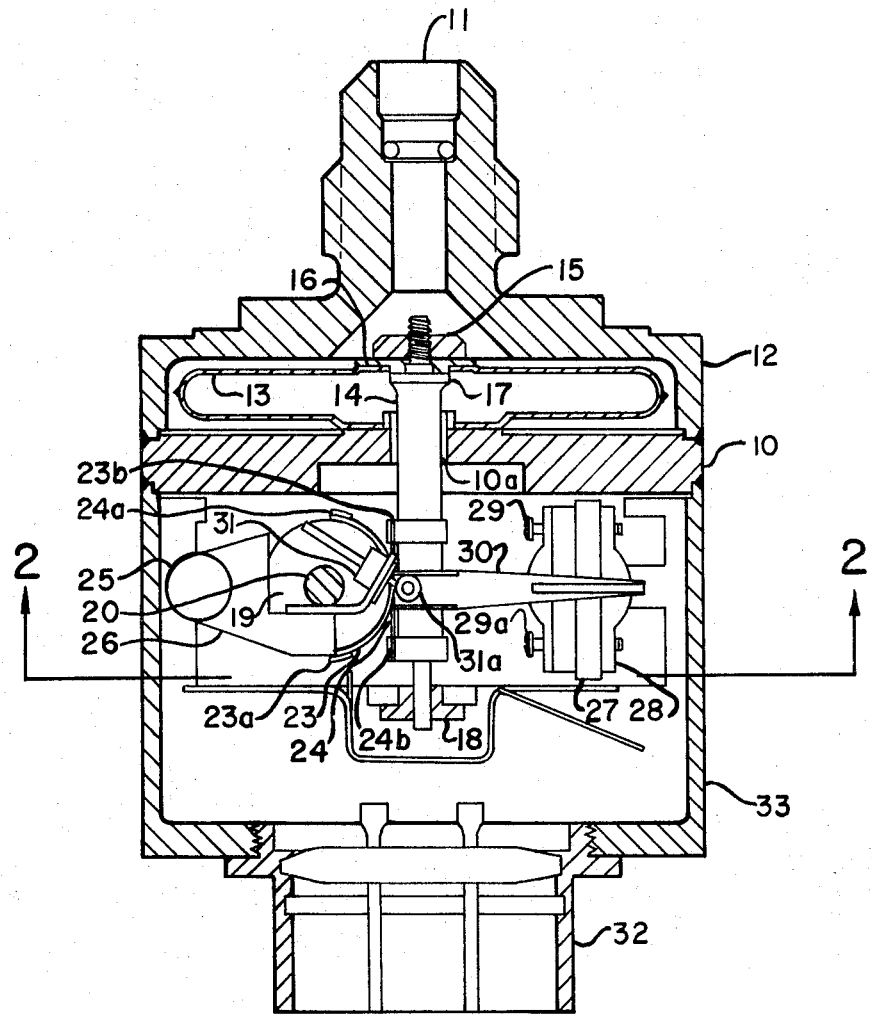
FIG. 1 is a longitudinal sectional view of a fluid-pressure transducer embodying the invention.
Figure 2:
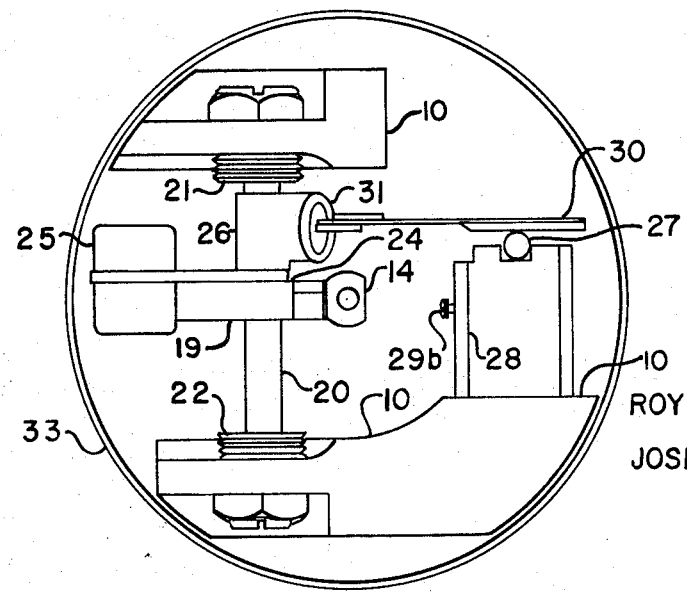
FIG. 2 is cross sectional view taken along the lines 2—2 of FIG. 1.

Referring more specifically to the drawings, there is illustrated a fluid-pressure transducer embodying the invention comprising a support and a fluid-pressure inlet. The support may be in the form of a supporting member 10 to which the remaining elements of the transducer are affixed directly or indirectly. The size of fluid-pressure inlet 11 is determined by the size of the opening in inlet housing 12. It should be noted that inlet housing 12 may be dispensed with, in which case, inlet 11 would comprise the entire area enclosed by housing 12.

The transducer of the invention further comprises a pressure-deflectable element, such as pressure capsule 13, which is accessible to inlet 11. There must be a pressure tight seal between the junction point of capsule 13 and support 10. This may be accomplished by any conventional means, such as soldering. Capsule 13 is disposed to deflect upon a change in the fluid pressure applied to inlet 11.

The transducer further comprises a pushrod 14 directly and positively secured to capsule 13. Pushrod 14, which passes through hole 10a in support 10, may be secured to capsule 13 by threading the end of pushrod 13 and employing a nut 15 as a fastener. In this regard it should be noted that the junction between capsule 13 and pushrod 14 must be sealed so as to be capable of withstanding applied pressures without leaking. This may be accomplished in any suitable manner, for example, a bushing 16 may be soldered to capsule 13 and urged against the lip of flange 17 by tightening nut 15 thereby effecting the required seal. It may also be necessary to solder or otherwise seal the junctions between nut 15, bushing 16, flange 17 and the screw threads of pushrod 14 to effect a proper seal. The free end of pushrod 14 may be supported by an antifriction bushing such as Teflon bushing 18.

The transducer still further includes a sheave 19 which is substantially in the same plane as pushrod 14. Sheave 19 is rotatably mounted on shaft 20 which may in turn be mounted on bearings 21 and 22 held by support 10. The axis of rotation of sheave 19 is substantially perpendicular to pushrod 14.

It is hereby defined, for purposes of this description, as well as the appended claims that an increase in inlet pressure causes a deflection of pushrod 14 to the right and a decrease in inlet pressure causes a deflection of pushrod 14 to the left. This relationship is to be understood even if in actuality the transducer is viewed in a specific orientation which would normally require the opposite relationship to exist. Therefore, for "right" and "left" as used in the specification and claims to correspond to reality, the transducer, illustrated in FIG. 1, should be viewed with inlet 11 to the viewer's left.

The transducer further comprises a pair of bands 23 and 24, each of which is affixed at one end to sheave 19 at points 23a and 24a respectively. Bands 23 and 24 wind on sheave 19, side by side, in opposite directions. The other ends of bands 23 and 24 are connected to pushrod 14 at points 23b and 24b respectively. A deflection of pushrod 14 to the right will cause band 23 to wind on to sheave 19 and band 24 to unwind from sheave 19. Conversely, a deflection of pushrod 14 to the left will cause band 24 to wind on to sheave 19 and band 23 to unwind from sheave 19. Therefore, it is readily seen that the minimum length of either band that must be wound on sheave 19 is dependent upon the maximum deflection of pushrod 14.

For a reason analogous to that outlined above, the distance between points 23b and 24b and a vertical line passing through the axis of rotation of sheave 19 is also dependent upon the maximum deflection of pushrod 14. This is due to the fact that the bands must be free to wind and unwind on sheave 19, as described, without restrictions for the full range of pushrod 14 deflections in both directions. The connections at points 23a, 23b, 24a, and 24b may be made in any conventional manner, for example, by welding.

In order to make the transducer unresponsive to acceleration forces a counterweight 25 may be employed. Counterweight 25 is secured to bracket 26 which in turn is secured to sheave 19 by any conventional means such as welding.

The fluid-pressure transducer of the invention further comprises means for utilizing the rotation of sheave 19 caused by the displacement of capsule 13 to develop an output effect. This means preferably is in the form of an elongated electrical impedance or resistance element 27 supported on bracket 28 and having insulated terminals 29 and 29a. Resistance element 27 is secured to bracket 28 in any conventional manner, for example, adhesive. An elongated and insulated wiper element 30, is affixed to terminal 31 at point 31a by riveting or other suitable fastening means. Terminal 31 is supported by bracket 26 which, as was previously explained, is also used to support counterweight 25. Upon a deflection of capsule 13, the relative displacement between wiper element 30 and resistance element 27 is greater than the deflection of pushrod 14. This multiplication of capsule deflection increases the accuracy of the output signal, especially for low pressure readings. The wires (not shown) which are connected to terminals 29a, 29b, and 31 may be connected to the terminals of connector 32.

It should also be noted that the above described mechanism converts the linear deflection of pushrod 14 into an angular motion of wiper 30. This angular wiping motion results in a continued change of wiper contact point between wiper 30 and resistance element 27 as pushrod 14 is deflected. This minimizes electrical noise as it assures a clean connection between wiper 30 and resistance element 27.

The pressure transducer described may be encased in an enclosed housing 33 hermetically sealed to support 10. If the transducer is to respond to absolute pressure then either housing 33 must be evacuated or the output signals must be biased to compensate for atmospheric pressure. If it is desired to respond to differential fluid pressure, a fluid connection (not shown) may be made to housing 33 so that the two fluid pressures may be applied to inlet 11 and housing 33, respectively.

It is believed that the operation of the transducer of the present invention will be clear from the foregoing description. Briefly, it may be assumed that the transducer is to respond to an absolute fluid pressure applied to inlet 11. If the absolute pressure increases, capsule 13 will be compressed and displace pushrod 14 to the right. This displacement will, by means of bands 23 and 24, cause sheave 19 to rotate. When sheave 19 rotates it causes relative displacement between resistance element 27 and wiper element 30 which change may be indicated by a signal appearing at connector 32. This relative displacement between resistance element 27 and wiper element 30 is greater than the displacement of pushrod 14. This motion multiplication is accomplished without any motion multiplying mechanism.

Obviously, if the absolute pressure applied to inlet 11 decreases, similar action takes place but in an opposite direction. It is also obvious that, if desired, the transducer may respond to a differential pressure rather than to an absolute pressure. As described above, the transducer responds to the difference between the two fluid pressures applied to inlet 11 and housing 33 respectively. The operation of the transducer per se is the same whether it responds to absolute or differential pressure.

The transducer, as described, is substantially unresponsive to acceleration and vibration forces in any direction. Such a force having a component along the axis of pushrod 14 would, of course, deflect capsule 11 unless it were compensated for by another opposing force. However, in the present invention the axial component of the inertia force of the transducer, including the force due to the mass of counterweight 25, serves to oppose the deflection of capsule 13 caused by any force of acceleration or vibration. Therefore, if the mass of counterweight 25 is properly selected, it will balance any acceleration or vibration forces acting to cause relative motion between resistance element 27 and wiper element 30 thereby reducing or eliminating any error which would otherwise result.

Now the benefit of utilizing opposing bands 23 and 24 can be seen. If a single band were employed, it would be able to compensate for the acceleration forces acting on capsule 13 only in one axial direction. Here, one or the other of bands 23 or 24 will effectively couple the mass of counterweight 25 to the unbalanced transducer mass, regardless of the axial direction of the acceleration or vibration force, to effect a cancellation of any unbalance force. In addition, any lost motion can be eliminated by pretensioning bands 23 and 24 during welding. With this type of arrangement, testing has shown that the present invention is relatively insensitive to vibration over broad magnitude and frequency spectrums.

Thus, it is seen that the fluid-pressure transducer described has a number of advantageous characteristics not found in prior devices of this type:

1. A direct and positive drive of wiper element 30 without the interposition of any costly motion-multiplying mechanism which would cause errors by introducing friction into the device.

2. Substantial elimination of the effect of acceleration and vibration forces, any such force being effectively cancelled out by opposing force coupled by means of the bands 23 and 24.

3. Angular wiping between resistance element 27 and wiper element 30, minimizing electrical noise and multiplying the relative motion therebetween.

While what has been shown and described is believed to be the best mode and preferred embodiment of the invention, modifications and variations can be made therein, as will be clear to those skilled in the art, without departing from the spirit of the invention and consequently, the scope of the invention is intended to be limited solely by the appended claims.

What is claimed is:

1. A fluid-pressure transducer comprising:
a support;
a pressure-deflectable element disposed to deflect in response to a change in fluid pressure;
a pushrod directly and positively secured to said deflectable element;
a sheave located substantially in the same plane as said pushrod and rotatably mounted on said support having its axis of rotation substantially perpendicular to said pushrod;
means for connecting said pushrod to said sheave in a manner such that any linear movement of said pushrod in response to the deflection of said deflectable element results in a pulling force being exerted on said sheave to cause a corresponding rotation thereof, there being no lost motion between said pushrod and sheave introduced by said connecting means; and
means actuated by the rotation of said sheave in response to the deflection of said deflectable element for developing an output effect.

2. A fluid-pressure transducer comprising:
a support;
a pressure-deflectable element disposed to deflect in response to a change in fluid pressure;
a pushrod directly and positively secured to said deflectable element;
means for slideably mounting the free end of said pushrod;
a sheave located substantially in the same plane as said pushrod and rotatably mounted on said support having its axis of rotation substantially perpendicular to said pushrod;
a pair of flexible bands, each of which is affixed at one end to said sheave and wound thereon side by side in opposite directions;
the free end of the first of said pair of bands being connected to said pushrod at a point on one side of the axis of said sheave; and
the free end of the second of said pair of bands being connected to said pushrod at a point on the opposite side of the axis of said sheave;
said bands being pretensioned to eliminate lost motion between said sheave and said pushrod;
means actuated by the rotation of said sheave in response to the deflection of said deflectable element for developing an output effect; and
a counterweight attached to said sheave;
Whereby, since there is no lost motion between said sheave and said pushrod, the effect of vibration and acceleration forces on said output developing means may be completely balanced and eliminated by said counterweight.

3. A pressure transducer in accordance with claim 2 wherein said means actuated by the rotation of said sheave for developing an output effect comprises;
- an electrical impedance element; and
- an insulated contact element one end of which is affixed to said sheave and the other end of which is in electrical contact with said impedance element;

whereby any displacement of said deflectable element causes said contact element to change its contact position on said impedance element.

* * * * *